United States Patent
Moriya (10) Patent No.: US 8,286,610 B2
(45) Date of Patent: Oct. 16, 2012

(54) CONTROL DEVICE FOR INTERNAL COMBUSTION ENGINE

(75) Inventor: Hidenori Moriya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 330 days.

(21) Appl. No.: 12/516,358

(22) PCT Filed: Apr. 30, 2008

(86) PCT No.: PCT/IB2008/001068
§ 371 (c)(1),
(2), (4) Date: May 27, 2009

(87) PCT Pub. No.: WO2008/146108
PCT Pub. Date: Dec. 4, 2008

(65) Prior Publication Data
US 2010/0049422 A1 Feb. 25, 2010

(30) Foreign Application Priority Data
May 1, 2007 (JP) .................. 2007-120949

(51) Int. Cl.
*F02M 7/00* (2006.01)
*F02D 41/00* (2006.01)
(52) U.S. Cl. ........ 123/304; 123/435; 123/672; 123/575; 701/103; 701/109
(58) Field of Classification Search .................. 123/1 A, 123/435, 494, 672, 304, 575; 701/103, 109, 701/114–115
See application file for complete search history.

(56) References Cited

U.S. PATENT DOCUMENTS

| | | | |
|---|---|---|---|
| 3,750,635 A | | 8/1973 | Hoffman et al. |
| 4,359,284 A | * | 11/1982 | Kude et al. ........................ 374/37 |
| 4,511,262 A | * | 4/1985 | Arcara ............................. 374/37 |
| 4,903,665 A | * | 2/1990 | Washino et al. ............... 123/435 |
| 4,905,649 A | * | 3/1990 | Washino et al. ............... 123/435 |
| 4,920,494 A | * | 4/1990 | Abo et al. ...................... 701/104 |

(Continued)

FOREIGN PATENT DOCUMENTS
JP 59 544 1/1984
(Continued)

OTHER PUBLICATIONS
Japanese Office Action dated Jul. 12, 2011 w/English Translation.

*Primary Examiner* — Thomas Moulis
(74) *Attorney, Agent, or Firm* — Oblon, Spivak, McClelland, Maier & Neustadt, L.L.P.

(57) ABSTRACT

In an internal combustion engine control device having an air-fuel ratio control device that controls the fuel injection amount so that the air-fuel ratio of exhaust gas of an internal combustion engine approaches a target stoichiometric air-fuel ratio, the control device further includes a device that calculates the lower calorific value of fuel, and a device that sets the target stoichiometric air-fuel ratio from the calculated lower calorific value based on a known relationship between the lower calorific value and the stoichiometric air-fuel ratio. It becomes possible to perform the air-fuel ratio control according to the fuel property by utilizing the relationship between the calorific value and the stoichiometric air-fuel ratio.

3 Claims, 6 Drawing Sheets

U.S. PATENT DOCUMENTS

| | | | |
|---|---|---|---|
| 4,976,241 A * | 12/1990 | Ishida et al. | 123/406.37 |
| 5,094,208 A * | 3/1992 | Adam et al. | 123/406.12 |
| 5,121,732 A * | 6/1992 | Benninger et al. | 123/672 |
| 5,156,126 A * | 10/1992 | Ohkubo et al. | 123/406.43 |
| 5,197,451 A * | 3/1993 | Yoshida et al. | 123/696 |
| 5,226,396 A * | 7/1993 | Bailey | 123/494 |
| 5,263,464 A * | 11/1993 | Yoshida et al. | 123/674 |
| 5,878,717 A * | 3/1999 | Zur Loye | 123/435 |
| 5,881,703 A * | 3/1999 | Nankee et al. | 123/686 |
| 6,055,963 A * | 5/2000 | Brown et al. | 123/525 |
| 6,101,986 A * | 8/2000 | Brown et al. | 123/27 GE |
| 6,279,559 B1 * | 8/2001 | Mauro et al. | 123/672 |
| 6,279,560 B1 * | 8/2001 | Mauro et al. | 123/674 |
| 6,289,275 B1 * | 9/2001 | Stander et al. | 701/104 |
| 6,745,613 B2 * | 6/2004 | Rendahl et al. | 73/35.02 |
| 6,805,099 B2 * | 10/2004 | Malaczynski et al. | 123/435 |
| 6,907,870 B2 * | 6/2005 | zur Loye et al. | 123/594 |
| 7,044,103 B2 * | 5/2006 | May | 123/299 |
| 7,117,862 B2 * | 10/2006 | May | 123/674 |
| 7,266,439 B2 * | 9/2007 | Wang et al. | 701/106 |
| 7,270,089 B2 * | 9/2007 | Wong | 123/27 GE |
| 7,650,223 B2 * | 1/2010 | Shiraishi et al. | 701/103 |
| 7,673,618 B2 * | 3/2010 | Hasegawa et al. | 123/435 |
| 7,774,124 B2 * | 8/2010 | Streib et al. | 701/101 |
| 7,962,275 B2 * | 6/2011 | Hokuto et al. | 701/104 |
| 2007/0215111 A1 * | 9/2007 | Surnilla | 123/431 |
| 2007/0261671 A1 * | 11/2007 | Nakagawa et al. | 123/435 |
| 2009/0024303 A1 * | 1/2009 | Schneider et al. | 701/103 |
| 2009/0064969 A1 * | 3/2009 | Miersch-Wiemers | 123/406.14 |
| 2009/0229588 A1 * | 9/2009 | Mallegbrein et al. | 123/703 |
| 2009/0306875 A1 * | 12/2009 | Jiang et al. | 701/102 |

FOREIGN PATENT DOCUMENTS

| | | |
|---|---|---|
| JP | 1 88153 | 4/1989 |
| JP | 04-001438 | 1/1992 |
| JP | 2907594 | 6/1999 |
| JP | 2000 170581 | 6/2000 |
| JP | 2002 188503 | 7/2002 |
| JP | 2003 120351 | 4/2003 |
| JP | 2007 32578 | 2/2007 |

* cited by examiner

CONTROL DEVICE FOR INTERNAL COMBUSTION ENGINE

BACKGROUND OF THE INVENTION

1. Field of the Invention

The invention relates to a control device for an internal combustion engine and, more particularly, to a control device that has a function of detecting a fuel property.

2. Description of the Related Art

There are a variety of components of fuels for internal combustion engines, and internal combustion engines adapted to the use of a blended fuel, such as an alcohol-blended fuel obtained by blending ethanol, methanol or the like with gasoline, have been put into practical use. Therefore, it is desirable that the property of the fuel can be detected on the vehicle side.

For the purpose of detecting the fuel property on the vehicle side, a device disclosed in Japanese Patent Application Publication No. 2000-170581 (JP-A-2000-170581) corrects the air-fuel ratio if an engine start failure or the like is detected, and, from the air-fuel ratio correction amount, estimates a theoretical air-fuel ratio (stoichiometric air-fuel ratio), and estimates an octane number from the theoretical air-fuel ratio.

Besides, a device disclosed in Japanese Patent Application Publication No. 64-88153 (JP-A-64-88153) detects the fuel property by calculating the calorific value in the cylinders from the detected value of the in-cylinder pressure, and therefore finding the lower calorific value of the fuel.

Besides, a technology of Japanese Patent No. 2907594 includes a storage device that stores relationships between the alcohol concentration in fuel, the theoretical air-fuel ratio, and the light/heavy component ratio of gasoline, and detects the light/heavy component ratio of the gasoline by comparing the data on the detected alcohol concentration and the detected theoretical air-fuel ratio (stoichiometric air-fuel ratio) with the data stored in the storage device.

However, the device of Japanese Patent Application Publication No. 2000-170581 (JP-A-2000-170581) is not able to detect the fuel property unless an engine start failure is detected, and also requires a considerable amount of time in order to converge the air-fuel ratio to the stoichiometric air-fuel ratio. The device of Japanese Patent Application Publication No. 64-88153 (JP-A-64-88153) is not able to control the air-fuel ratio. As for the device of Japanese patent No. 2907594, the alcohol concentration and the stoichiometric air-fuel ratio need to be found by other devices or the like, so that a simpler device is desired. In the meantime, there is no known control device that utilizes a relationship between the calorific value and the stoichiometric air-fuel ratio.

SUMMARY OF THE INVENTION

Accordingly, in view of the foregoing problems, the invention provides a novel control device having a fuel property detection function which performs a control by utilizing a relationship between the calorific value and the stoichiometric air-fuel ratio.

According to one aspect of the invention, there is provided an internal combustion engine control device including an air-fuel ratio sensor that detects air-fuel ratio of an exhaust gas of an internal combustion engine, and an air-fuel ratio control device that controls a fuel injection amount so that the air-fuel ratio detected by the air-fuel ratio sensor approaches a target stoichiometric air-fuel ratio, the control device further including. a lower calorific value calculation device that calculates a lower calorific value of a fuel; and a target stoichiometric air-fuel ratio setting device that sets the target stoichiometric air-fuel ratio from the calculated lower calorific value based on a known relationship between the lower calorific value and a stoichiometric air-fuel ratio.

According to the foregoing internal combustion engine control device, the lower calorific value of fuel is calculated, and a target stoichiometric air-fuel ratio is set from the calculated lower calorific value on the basis of a known relationship between the lower calorific value and the stoichiometric air-fuel ratio. Therefore, it becomes possible to perform the air-fuel ratio control according to the fuel property by utilizing the relationship between the calorific value and the stoichiometric air-fuel ratio.

Besides, it is also preferred that the control device further include an in-cylinder pressure sensor that detects pressure in a cylinder of the internal combustion engine, and that the lower calorific value calculation device have a pressure-based lower calorific value calculation device that calculates the lower calorific value by using a heat generation amount calculated based on a detected in-cylinder pressure value that is detected by the in-cylinder pressure sensor. In this case, a simple construction can achieve effects expected of the invention.

In order to find the heat generation amount from the detected value from the in-cylinder pressure sensor, it is preferable that a multiplication product value $PV^\kappa$ of the detected in-cylinder pressure P and the value obtained by raising the combustion chamber capacity V given at the time point of detection of the in-cylinder pressure P to an exponent that is in the vicinity of the specific heat ratio K of the supplied mixture be calculated as the foregoing heat generation amount parameter. From the gas state equation, $PV=nRT$ (P is volume; n is the number of moles of gas; R is the gas constant $(J/(mol \times K))$; T is temperature (K)), it is known that $PV^\kappa$ is constant during adiabatic change. Therefore, the amount of change of $PV^\kappa$ (i.e., the difference between two points) when the combustion of fuel occurs in the combustion chamber depends on the energy produced by the combustion. Hence, $PV^\kappa$ has a high correlation with the heat generation amount provided in the combustion chamber, so that the use of $PV^\kappa$ as a heat generation amount parameter in determining the fuel property makes it possible to determine the property of the fuel with increased accuracy. The in-cylinder pressure P can be directly detected by the in-cylinder pressure sensor, and the volume (in-cylinder capacity) V can be univocally found from the crank angle through the use of a predetermined map or function. As for the constant κ, it suffices that the constant be a value in the vicinity of the specific heat ratio of the mixture formed in the combustion chamber. The constant κ may be a predetermined fixed value, or may also be changed according to the intake air amount, the fuel injection amount or the like.

Besides, it is preferred that the control device further include a stoichiometric air-fuel ratio calculation device that calculates the stoichiometric air-fuel ratio based on the air-fuel ratio detected value detected by the air-fuel ratio sensor, and that the lower calorific value calculation device have an air-fuel ratio-based lower calorific value calculation device that calculates the lower calorific value of the fuel from the stoichiometric air-fuel ratio calculated by the stoichiometric air-fuel ratio calculation device, based on the known relationship between the lower calorific value and the stoichiometric air-fuel ratio.

Besides, it is also preferred that the control device further include an $O_2$ sensor that detects oxygen concentration in the exhaust gas of the internal combustion engine, and that the air-fuel ratio-based lower calorific value calculation device calculate the lower calorific value based on a weighted average stoichiometric air-fuel ratio calculated by weighting the air-fuel ratio detected by the air-fuel ratio sensor with an output value of the $O_2$ sensor.

According to the foregoing control device, since the weighted average of the output of the air-fuel ratio sensor that is weighted with the oxygen concentration is used instead of the simple average thereof, a weighted average stoichiometric air-fuel ratio can be calculated even during a state in which a stable stoichiometric point is not obtained by the $O_2$ feedback control.

Furthermore, it is also preferred that the control device further include a diagnostic device that diagnoses at least one of the air-fuel ratio-based lower calorific value calculation device and the pressure-based lower calorific value calculation device based on comparison between a value of the lower calorific value calculated by the air-fuel ratio-based lower calorific value calculation device and a value of the lower calorific value calculated by the pressure-based lower calorific value calculation device.

According to a second aspect of the invention, there is provided an internal combustion engine control device including an air-fuel ratio sensor that detects air-fuel ratio of an exhaust gas of an internal combustion engine, and a stoichiometric air-fuel ratio calculation device that calculates a stoichiometric air-fuel ratio based on the air-fuel ratio detected value detected by the air-fuel ratio sensor, the control device further including an air-fuel ratio-based lower calorific value calculation device that calculates a lower calorific value of a fuel from the stoichiometric air-fuel ratio calculated by the stoichiometric air-fuel ratio calculation device, based on a known relationship between the lower calorific value and the stoichiometric air-fuel ratio.

According to the foregoing internal combustion engine control device, it becomes possible to calculate the calorific value reversely from the stoichiometric air-fuel ratio by utilizing the relationship between the calorific value and the stoichiometric air-fuel ratio; thus, a novel device for calculating the calorific value can be provided.

Besides, it is preferred that the control device further include an $O_2$ sensor that detects oxygen concentration in the exhaust gas of the internal combustion engine, and that the air-fuel ratio-based lower calorific value calculation device calculate the lower calorific value based on a weighted average stoichiometric air-fuel ratio calculated by weighting the air-fuel ratio detected by the air-fuel ratio sensor with an output value of the $O_2$ sensor.

Furthermore, the control device may also include. an in-cylinder pressure sensor that detects pressure in a cylinder of the internal combustion engine; a pressure-based lower calorific value calculation device that calculates the lower calorific value based on the detected in-cylinder pressure value; and a diagnostic device that diagnoses at least one of the air-fuel ratio-based lower calorific value calculation device and the pressure-based lower calorific value calculation device based on comparison between a value of the lower calorific value calculated by the air-fuel ratio-based lower calorific value calculation device and a value of the lower calorific value calculated by the pressure-based lower calorific value calculation device. In this case, a novel device for diagnosing a detection system can be provided.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in greater detail with reference to example embodiments.

Figure 1:
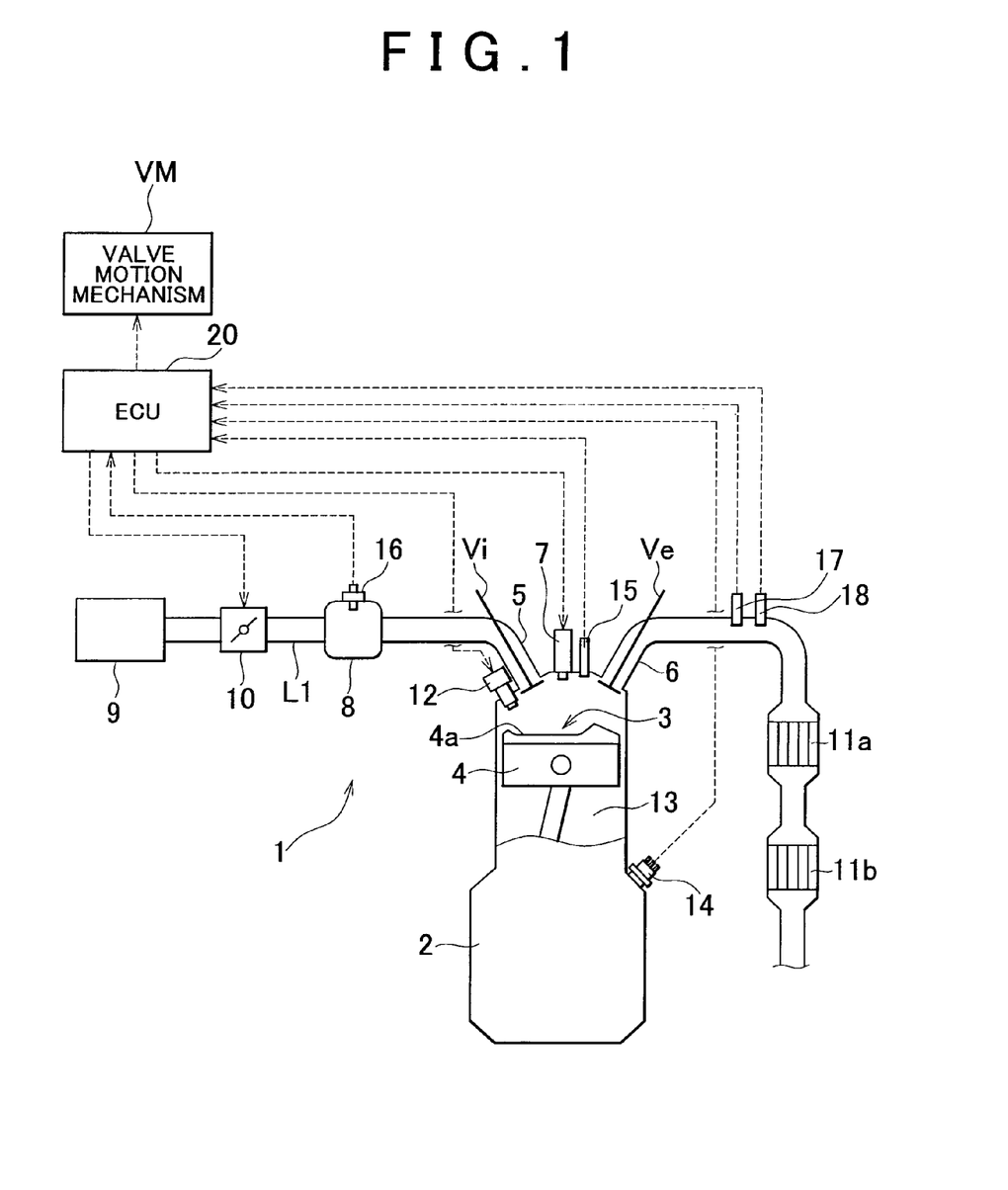
FIG. 1 is a general construction diagram showing an internal combustion engine to which a control device according to the invention is applied.

FIG. 1 is a general construction diagram showing an internal combustion engine to which a control device according to the invention is applied. An internal combustion engine 1 shown in FIG. 1 generates power by burning a mixture of fuel and air within a combustion chamber 3 formed in a cylinder block 2 so as to reciprocate a piston 4 in a cylinder 13. The internal combustion engine 1 is capable of operating on gasoline, and also on a blended fuel of gasoline and alcohol. It is preferable that the internal combustion engine 1 be constructed as a multi-cylinder engine. The internal combustion engine 1 in this embodiment is constructed as, for example, a four-cylinder engine.

Intake ports of the individual combustion chambers 3 are connected to an intake pipe (intake manifold) 5, and exhaust ports of the combustion chambers 3 are connected to an exhaust pipe (exhaust manifold) 6. Besides, in a cylinder head of the internal combustion engine 1, intake valves Vi are provided separately for the individual combustion chambers 3. Each intake valve Vi opens and closes a corresponding one of the intake ports, and each exhaust valve Ve opens and closes a corresponding one of the exhaust ports. The intake valves Vi and the exhaust valves Ve are opened and closed by a valve motion mechanism VM that includes a variable valve timing mechanism. Furthermore, the internal combustion engine 1 has ignition plugs 7 whose number corresponds to the number of cylinders. Each ignition plug 7 is disposed in the cylinder head so as to face the interior of the corresponding combustion chamber 3.

The intake pipe 5 is connected to a surge tank 8 as shown in FIG. 1. An air supply line L1 is connected to the surge tank 8. The air supply line L1 is connected to an air intake opening (not shown) via an air cleaner 9. In an intermediate portion of the air supply line L1 (between the surge tank 8 and the air cleaner 9), a throttle valve (in this embodiment, an electronically controlled throttle valve) 10 is installed. On the other hand, the exhaust pipe 6 is connected with a preceding catalyst device 11a that includes, for example, a three-way catalyst, and a succeeding catalyst device 11b that includes, for example, a NOx storage reduction catalyst, as shown in FIG. 1.

Furthermore, the internal combustion engine 1 has a plurality of injectors 12. As shown in FIG. 1, each injector 12 is disposed in the cylinder head so as to face the interior of a corresponding one of the combustion chambers 3. Besides, each piston 4 of the internal combustion engine 1 is constructed to have a so-called bowl top shape, that is, an upper surface of each piston 4 has a recess 4a. In the internal combustion engine 1, after air has been taken into the combustion chamber 3 of a cylinder 13, fuel, such as gasoline or the like, is injected from the injector 12 toward the recess 4a of the piston 4 in the combustion chamber 3.

As a result, in the internal combustion engine 1, a layer of mixture of fuel and air is formed near the ignition plug 7 in a state in which the layer of mixture is separated from the surrounding air layers (stratified charge), so that it is possible to execute a stable stratified charge combustion by using a very fuel-lean mixture. In addition, although the internal combustion engine 1 in the embodiment is described as a so-called direct-injection engine, it is to be understood that the internal combustion engine 1 is not limited so, but that the invention is also applicable to intake pipe (intake port) injection-type internal combustion engines.

The injection plugs 7, the throttle vale 10, the injectors 12, the valve motion mechanism VM, etc. described above are electrically connected to an ECU 20 that functions as a control device of the internal combustion engine 1. The ECU 20 includes a CPU, a ROM, a RAM, input/output ports, a storage device, etc., (none of which is shown). As shown in FIG. 1, various sensors are electrically connected to the ECU 20, including a crank angle sensor 14 of the internal combustion engine 1, and the like. The ECU 20 controls the injection plugs 7, the throttle valve 10, the injectors 12, the valve motion mechanism VM, etc. so that a desired engine output is obtained, through the use of various maps stored in the storage device, and on the basis of the detected values from the various sensors.

Besides, the internal combustion engine 1 also has in-cylinder pressure sensors (in-cylinder pressure detection means) 15 whose number corresponds to the number of cylinders. Each in-cylinder pressure sensor 15 includes a semiconductor element, a piezoelectric element, a magnetostrictive element, an optical fiber detection element, etc. Each in-cylinder pressure sensor 15 is disposed in the cylinder head so that a pressure-receiving surface thereof faces into the combustion chamber 3, and is electrically connected to the ECU 20 via an A/D converter or the like (not shown). Each in-cylinder pressure sensor 15 outputs the pressure acting on its pressure-receiving surface in the combustion chamber 3 as a value relative to the atmospheric pressure, that is, gives to the ECU 20 a voltage signal that corresponds to the pressure acting on the pressure-receiving surface of the sensor (i.e., a signal indicating the detected value of the in-cylinder pressure).

Furthermore, the internal combustion engine 1 has an intake air pressure sensor 16 that detects the pressure of intake air in the surge tank 8 (intake air pressure) as an absolute pressure. The intake air pressure sensor 16 is also electrically connected to the ECU 20 via an A/D converter or the like (not shown), and gives to the ECU 20 a signal indicating the detected absolute pressure of intake air in the surge tank 8. In addition, the detected values from the crank angle sensor 14 and the intake air pressure sensor 16 are sequentially given to the ECU 20 at very short time intervals, and are stored and held in a predetermined storage region (buffer) of the ECU 20, a predetermined amount at a time. Besides, the detected values from the in-cylinder pressure sensors 15 (values of in-cylinder pressure) are corrected to values of the absolute pressure on the basis of the detected value from the intake air pressure sensor 16, and then are stored and held in a predetermined storage region (buffer) of the ECU 20, a predetermined amount at a time.

The internal combustion engine 1 further has an A/F sensor 17 that detects the air-fuel ratio in the exhaust pipe 6, and an $O_2$ sensor 18 that detects the oxygen concentration in the exhaust pipe 6, at a site preceding the preceding catalyst device 11a. The A/F sensor 17 and the $O_2$ sensor 18 give their respective detection signals to the ECU 20. The A/F sensor 17 is a full-range air-fuel ratio sensor (linear air-fuel ratio sensor) that produces an output voltage proportional to the air-fuel ratio of the mixture resulting from the combustion in the internal combustion engine 1. The $O_2$ sensor 18 detects whether the air-fuel ratio of the mixture resulting from the combustion in the internal combustion engine 1 is rich or lean of the theoretical air-fuel ratio in an on-off manner.

Figure 2:
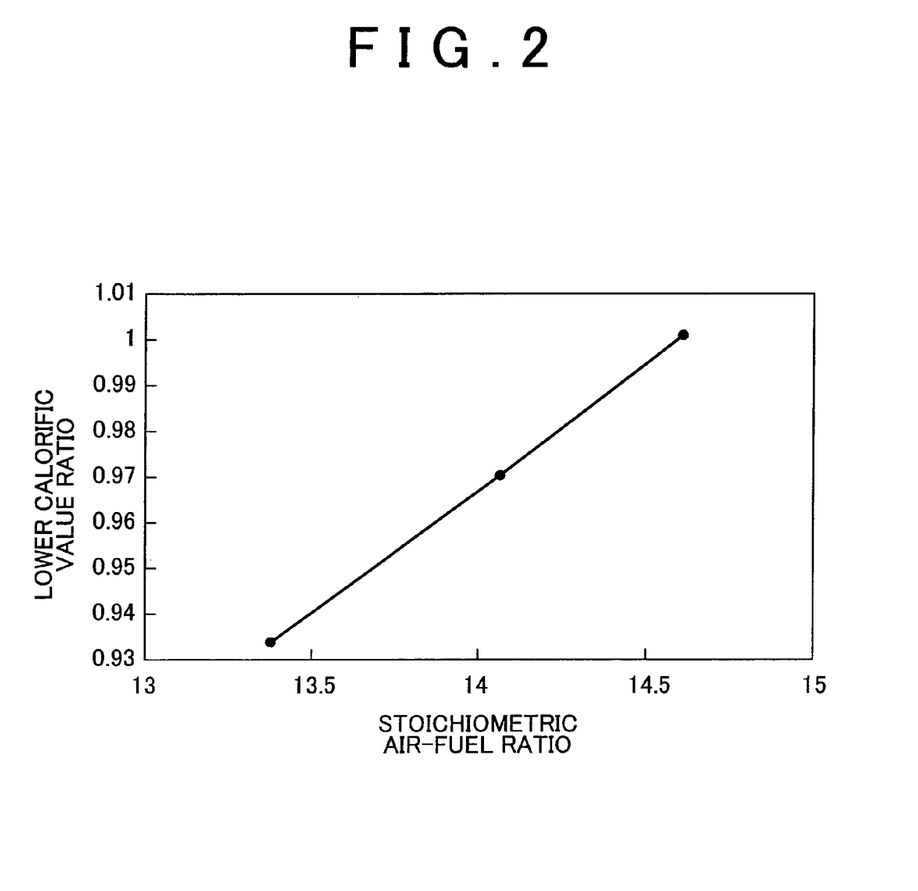
FIG. 2 is a graph showing a construction example of a stoichiometric air-fuel ratio-lower calorific value ratio map.

The ROM of the ECU 20 stores a stoichiometric air-fuel ratio-lower calorific value ratio map prepared beforehand, such as the one shown in FIG. 2. This map stores a known relationship between the stoichiometric air-fuel ratio and the lower calorific value ratio, and is constructed so that each one of the two values can be found from the other. The stoichiometric air-fuel ratio herein is an air-fuel ratio that occurs when the oxygen in air and the fuel react without surplus or shortage, and thus completely burn. The lower calorific value ratio herein is the proportion of the lower calorific value of the present fuel to the lower calorific value of a standard gasoline fuel. As shown in FIG. 2, the stoichiometric air-fuel ratio and the lower calorific value ratio are generally in proportion.

The ROM of the ECU 20 stores two kinds of fuel injection amount maps, two kinds of injection timing maps, and two kinds of ignition timing maps that are prepared beforehand. Of the two kinds of maps, one kind of maps corresponds to gasoline fuel, and the other corresponds to gasoline-alcohol blended fuel. In addition, each map is constructed so that, for example, by using the intake air amount and the engine rotation speed as input variables, the amount of fuel injection, the injection timing and the ignition timing corresponding to these values can be read out. The ROM of the ECU 20 further stores functions and programs for correcting the fuel injection amount, the injection timing and the ignition timing read from the maps on the basis of various parameters that indicate engine operation states, such as the intake air temperature, the degree of throttle opening, the engine water temperature, etc.

In this embodiment, an air-fuel ratio feedback control is performed which controls the fuel injection amount so that the air-fuel ratio approaches a target stoichiometric air-fuel ratio. Concretely, the air-fuel ratio feedback control is executed by finding a deviation between a pre-set target stoichiometric air-fuel ratio A/Ftgt and the detected value from the A/F sensor 17, and by changing the fuel injection amount by an amount that corresponds to the deviation in such a direction that the deviation approaches zero.

Figure 3:
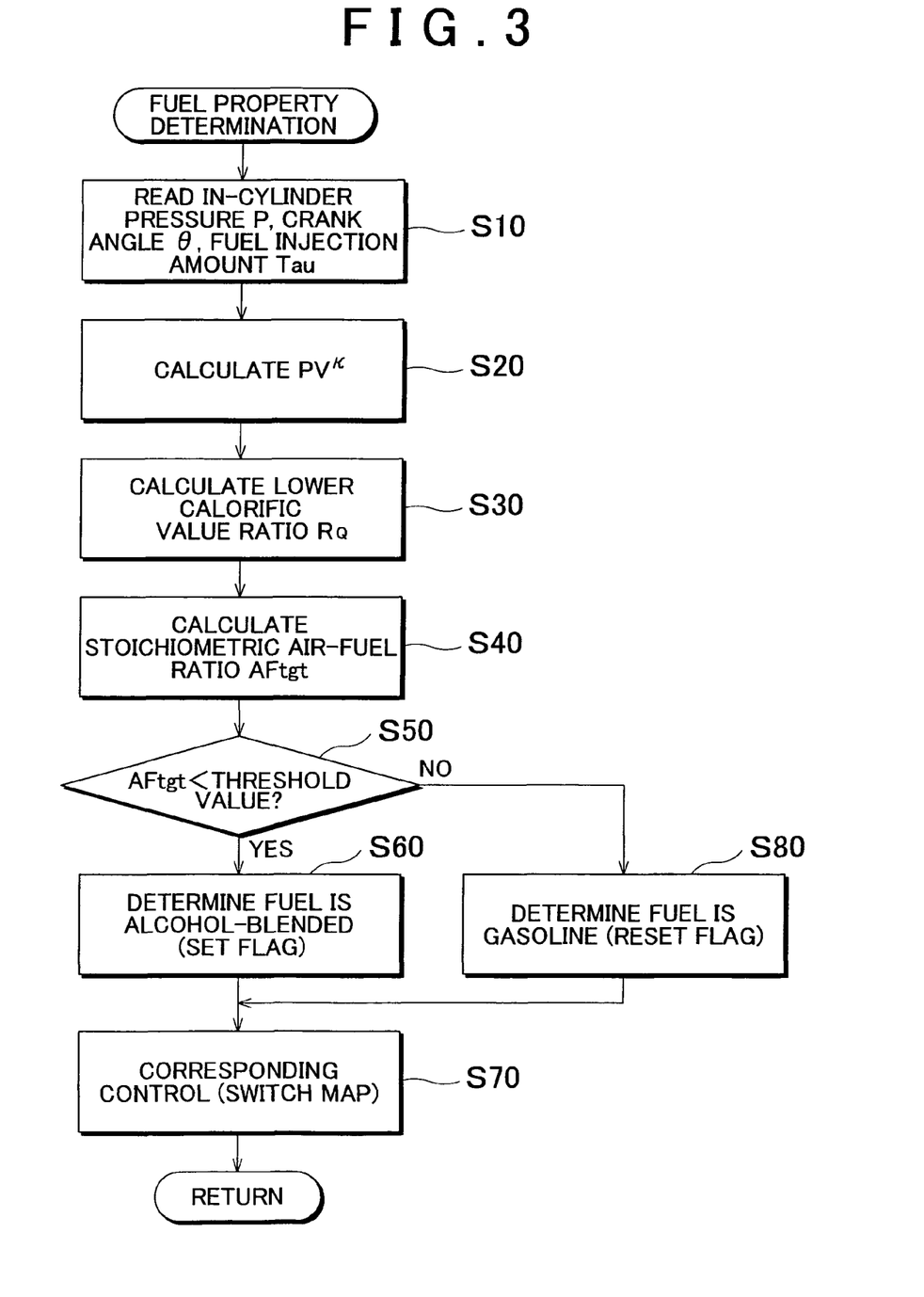
FIG. 3 is a flowchart showing a fuel property determination process in a first embodiment of the invention.
Figure 4:
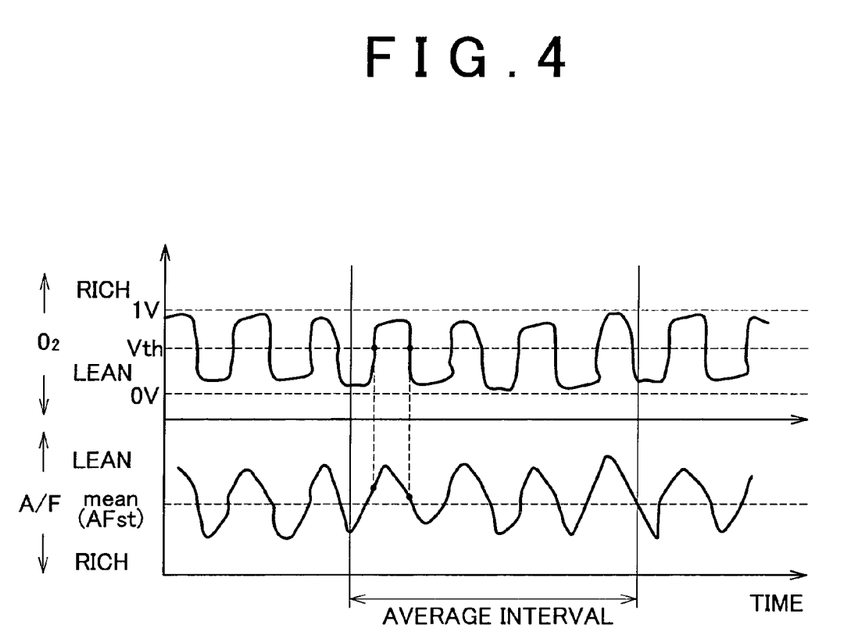
FIG. 4 is a graph showing an example of the execution of an air-fuel ratio feedback control in a second embodiment.

Next, with reference to FIG. 3, a procedure of determining a fuel property in the foregoing internal combustion engine 1 will be described. When an ignition key (not shown) is operated so as to start the internal combustion engine 1, the ECU 20 starts to execute a fuel property determination process shown in FIG. 3 repeatedly at intervals of a predetermined time period. In FIG. 3, the ECU 20 firstly reads parameters that show engine conditions (S10). The parameters read in this step are the in-cylinder pressure P, the crank angle θ and the fuel injection amount Tau. For each cylinder, these parameters are acquired and stored in predetermined storage regions of the ECU 20 with respect to a plurality of predetermined crank angles θ.

Next, the ECU 20 calculates, as a heat generation parameter, a value $PV^\kappa$ for each cylinder from the in-cylinder pressure P, the in-cylinder volume V, and the specific heat ratio $\kappa$ predetermined as described above which occur at a predetermined reference crank angle, or from values near the foregoing values (S20), and stores the values $PV^\kappa$ in predetermined storage regions of the ECU 20.

After completion of the detection and computation with respect to all the cylinders, the ECU 20 calculates the lower calorific value ratio $R_Q$ (S30). The lower calorific value ratio herein is the ratio of the lower calorific value of the fuel as a detection object to the lower calorific value of the standard gasoline fuel. Concretely, using the following equation (1), the ECU 20 calculates a lower calorific value ratio $R_Q$ by regarding the amount of rise $\Delta PV^\kappa$ of the value $PV^\kappa$ calculated in step S20 from the intake bottom dead center as being equal to the indicated calorific value Qind of the fuel, and dividing the indicated calorific value Qind by the lower calorific value Qref per predetermined unit of the standard gasoline fuel, the fuel injection amount Tau during the detection period, and a conversion coefficient x for conversion into the lower calorific value.

$$R_Q = \frac{Q_{ind}}{Q_{ref} \times Tau \times x} \quad (1)$$

The value of the lower calorific value ratio $R_Q$ varies depending on the property of fuel. In the case of alcohol-blended fuel, the value of the lower calorific value ratio $R_Q$ is smaller than in the case of gasoline fuel.

Then, by referring to the foregoing stoichiometric air-fuel ratio-lower calorific value ratio map (FIG. 2) through the use of the lower calorific value ratio $R_Q$, the ECU 20 calculates a stoichiometric air-fuel ratio AFtgt that corresponds to the lower calorific value ratio $R_Q$ (S40). The stoichiometric air-fuel ratio AFtgt calculated herein is used as a target stoichiometric value in an air-fuel ratio feedback control described below.

Next, the ECU 20 compares the calculated stoichiometric air-fuel ratio AFtgt with a threshold value that is predetermined as a value that corresponds to the standard gasoline fuel (S50). If the stoichiometric air-fuel ratio AFtgt is smaller than the threshold value, the ECU 20 determines that the fuel is alcohol-blended fuel, and sets a predetermined blended fuel usage flag (S60). Besides, if the stoichiometric air-fuel ratio AFtgt is greater than or equal to the threshold value, the ECU 20 determines that the fuel is a gasoline fuel, and resets the blended fuel usage flag (S80).

Then, in response to these determinations regarding the fuel ignitability (S60 and S80), the ECU 20 switches the operation maps. Concretely, if the reference to the blended fuel usage flag shows that alcohol-blended fuel is being used, the maps for alcohol-blended fuel are selected from the two kinds of the fuel injection amount maps, the fuel injection timing maps and the ignition timing maps so as to be used for the controls of the fuel injection amount, the injection timing and the ignition timing. On the other hand, if the reference to, the flag shows that gasoline fuel is being used, the maps for gasoline fuel are selected for the same controls.

As a result of the foregoing process, if the stoichiometric air-fuel ratio AFtgt is smaller than the threshold value, the control maps for alcohol-blended fuel are selected to be used for the controls of the engine.

The stoichiometric air-fuel ratio AFtgt calculated in step S40 is used as a target value in the air-fuel ratio feedback control. The air-fuel ratio feedback control controls the fuel injection amount so that the detected value AF from the A/F sensor 17 disposed in the exhaust passageway comes to match the target stoichiometric air-fuel ratio AFtgt. Concretely, a correction amount is calculated by multiplying the deviation between the target stoichiometric air-fuel ratio AFtgt and the detected value AF by a proportional gain Kc, and the correction amount is added to or subtracted from the present fuel injection amount. In addition, in the control system of the air-fuel ratio feedback control, the actions of an adjustment portion of calculating the feedback correction amount includes not only the proportional (P) action (P term) of the action, but also the integral (I) action (I term) having a function of eliminating the steady deviation, and a differential (D) action (D term) of avoiding instability of the control caused by the introduction of the integral action (so-called PID control (Proportional Integral Differential control)). In the embodiment, however, since the target stoichiometric air-fuel ratio AFtgt is changed according to the fuel property (S40), the engine operation is performed at a proper stoichiometric air-fuel ratio according to the fuel property.

As described above, in the embodiment, the lower calorific value Qind of fuel is calculated, and the target stoichiometric air-fuel ratio AFtgt is set on the basis of the calculated lower calorific value (S40). Therefore, it becomes possible to perform the air-fuel ratio control according to the fuel property by utilizing the relationship between the calorific value and the stoichiometric air-fuel ratio.

Besides, in the embodiment, since the lower calorific value Qind is calculated by using the amount of heat generation obtained from the detected value P from the in-cylinder pressure sensor, effects expected of the invention can be achieved by a simple construction.

Next, a second embodiment of the invention will be described. A control device for an internal combustion engine that has means for calculating a stoichiometric air-fuel ratio on the basis of components of exhaust gas in the second embodiment is characterized by including means for calculating a lower calorific value on the basis of the stoichiometric air-fuel ratio. The mechanical construction of the second embodiment is substantially the same as that of the first embodiment, and detailed description thereof is omitted.

In the second embodiment, an $O_2$ feedback control of maintaining the air-fuel ratio at the stoichiometric air-fuel ratio while switching the air-fuel ratio between the lean side and the rich side at every predetermined time by controlling the fuel injection amount on the basis of the detected value from the $O_2$ sensor 18 is performed, separately from the fuel property determination process in accordance with the invention. Then, the stoichiometric air-fuel ratio is calculated on the basis of the detected value from the $O_2$ sensor 18 and the detection value from the A/F sensor 17 during execution of the $O_2$ feedback control, and the fuel property is determined on the basis of the calculated stoichiometric air-fuel ratio.

Figure 5:
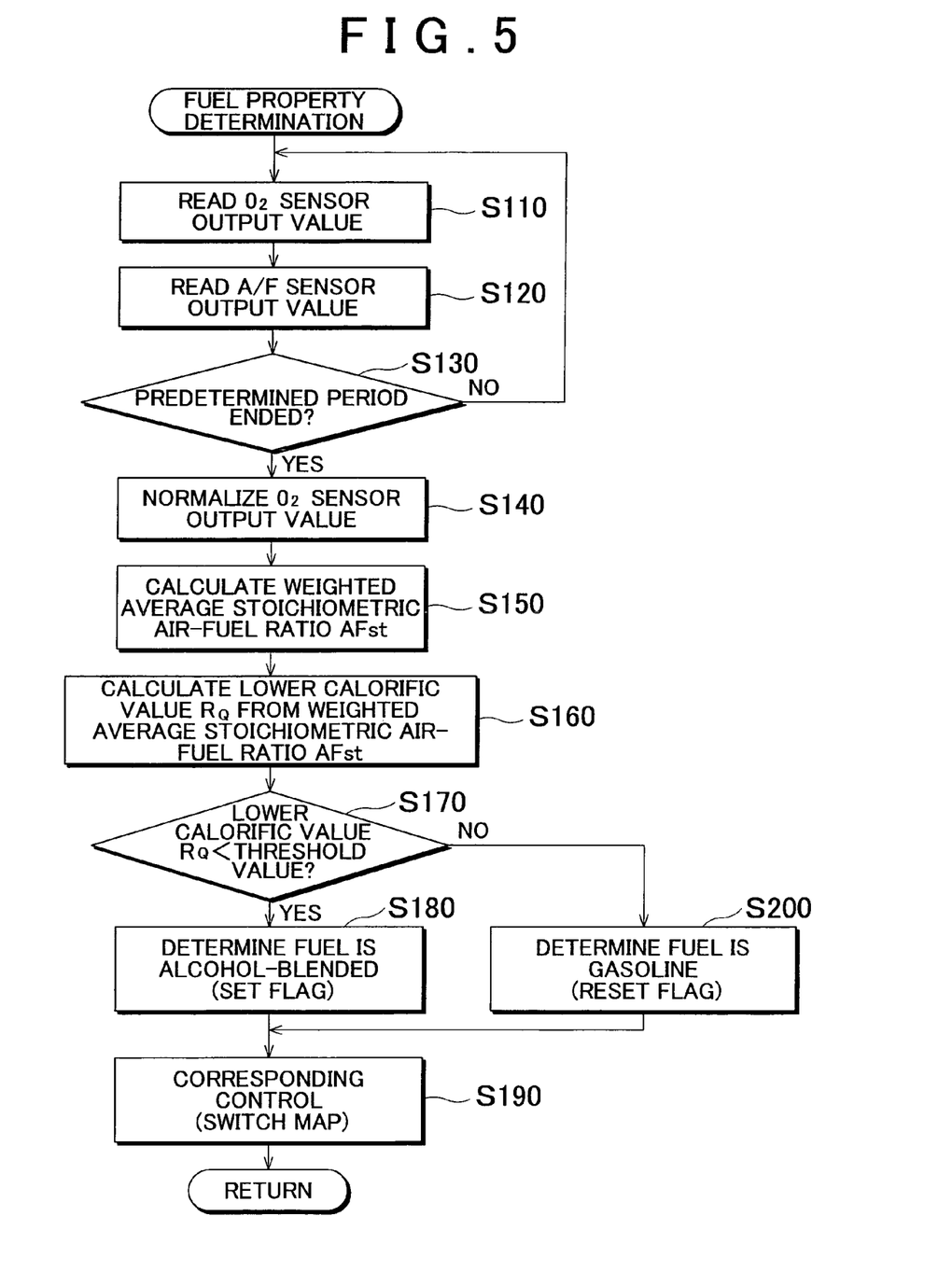
FIG. 5 is a flowchart showing a fuel property determination process in the second embodiment.

A process routine shown in FIG. 5 is executed on condition that the $O_2$ feedback control is being executed. Firstly, the ECU 20 reads the output of the $O_2$ sensor 18 (S110), and stores it in the memory. Next, the ECU 20 reads the output of the A/F sensor 17 (S120), and stores it in the memory. The process of steps S110 and S120 is repeatedly executed over a predetermined cycle period of the switching of the output signal of the $O_2$ sensor 18 (S130). The counting of the cycle period may be performed by utilizing an action command output for the injectors 12, or may also be performed by analyzing the output signal of the $O_2$ sensor 18.

After the $O_2$ sensor outputs and the A/F sensor outputs of the predetermined cycle period are obtained, the ECU 20 normalizes the stored output values of the $O_2$ sensor 18 of a plurality of cycle periods into a range of 0 to 1, with 1 being the maximum value and 0 being the minimum value (S140).

Next, using the thus-normalized output values $O_2i$ (i=1 to k) of the $O_2$ sensor 18, and the output values AFi (i=1 to k) of the A/F sensor 17 acquired at timings corresponding to the output values $O_2i$ of the $O_2$ sensor 18, the ECU 20 calculates a weighted average stoichiometric air-fuel ratio AFst that is a weighted average of AFi that is weighted with $O_2i$, as in the following equation (2).

$$AF_{st} = \frac{\sum_{i=1}^{k}(AF_i \times O_{2i})}{\sum_{i=1}^{k} O_{2i}} \quad (2)$$

Then, the ECU 20 calculates a lower calorific value ratio $R_Q$ that corresponds to the calculated weighted average stoichiometric air-fuel ratio AFst, by referring to the foregoing stoichiometric air-fuel ratio-lower calorific value ratio map (FIG. 2) (S160).

Next, the ECU 20 compares the calculated lower calorific value ratio $R_Q$ with a threshold value that is predetermined as a value that corresponds to the standard gasoline fuel (S170). If the lower calorific value ratio $R_Q$ is smaller than the threshold value, the ECU 20 determines that the fuel being used is alcohol-blended fuel, and sets the predetermined blended fuel usage flag (S180). In the case where the lower calorific value ratio $R_Q$ is greater than or equal to the threshold value, the ECU 20 determines that the fuel being used is gasoline fuel, and resets the blended fuel usage flag (S200).

In response to the determination regarding fuel ignitability (S180, S200), the ECU 20 switches engine operation maps (S190). Concretely, if the reference to the blended fuel usage flag shows that alcohol-blended fuel is being used, the maps for alcohol-blended fuel are selected from the two kinds of the fuel injection amount maps, the fuel injection timing maps and the ignition timing maps so as to be used for the controls of the fuel injection amount, the injection timing and the ignition timing. On the other hand, if the reference to the flag shows that gasoline fuel is being used, the maps for gasoline fuel are selected for the same controls. As a result of the foregoing process, if the lower calorific value ratio $R_Q$ is smaller than the threshold value, the control maps for alcohol-blended fuel are selected to be used for the controls of the engine.

The weighted average stoichiometric air-fuel ratio AFst calculated in step S150 is used as a target value in the air-fuel ratio feedback control; specifically, the fuel injection amount is controlled so that the detected value AF from the A/F sensor 17 disposed in the exhaust passageway comes to match the target value, that is, the stoichiometric air-fuel ratio AFst.

As described above, in the second embodiment, it becomes possible to calculate the calorific value reversely from the stoichiometric air-fuel ratio by utilizing the relationship between the calorific value and the stoichiometric air-fuel ratio; thus, novel means for calculating the calorific value can be provided. Therefore, it becomes possible to eliminate the need for the calculation of the calorific value through the use of the in-cylinder pressure sensor 15. Besides, in the embodiment, since the weighted average of the output of the A/F sensor 17 that is weighted with the oxygen concentration is used instead of the simple average thereof, there is an advantage of being able to calculate the weighted average stoichiometric air-fuel ratio even during a state in which a stable stoichiometric point due to the $O_2$ feedback control is not obtained.

Figure 6:
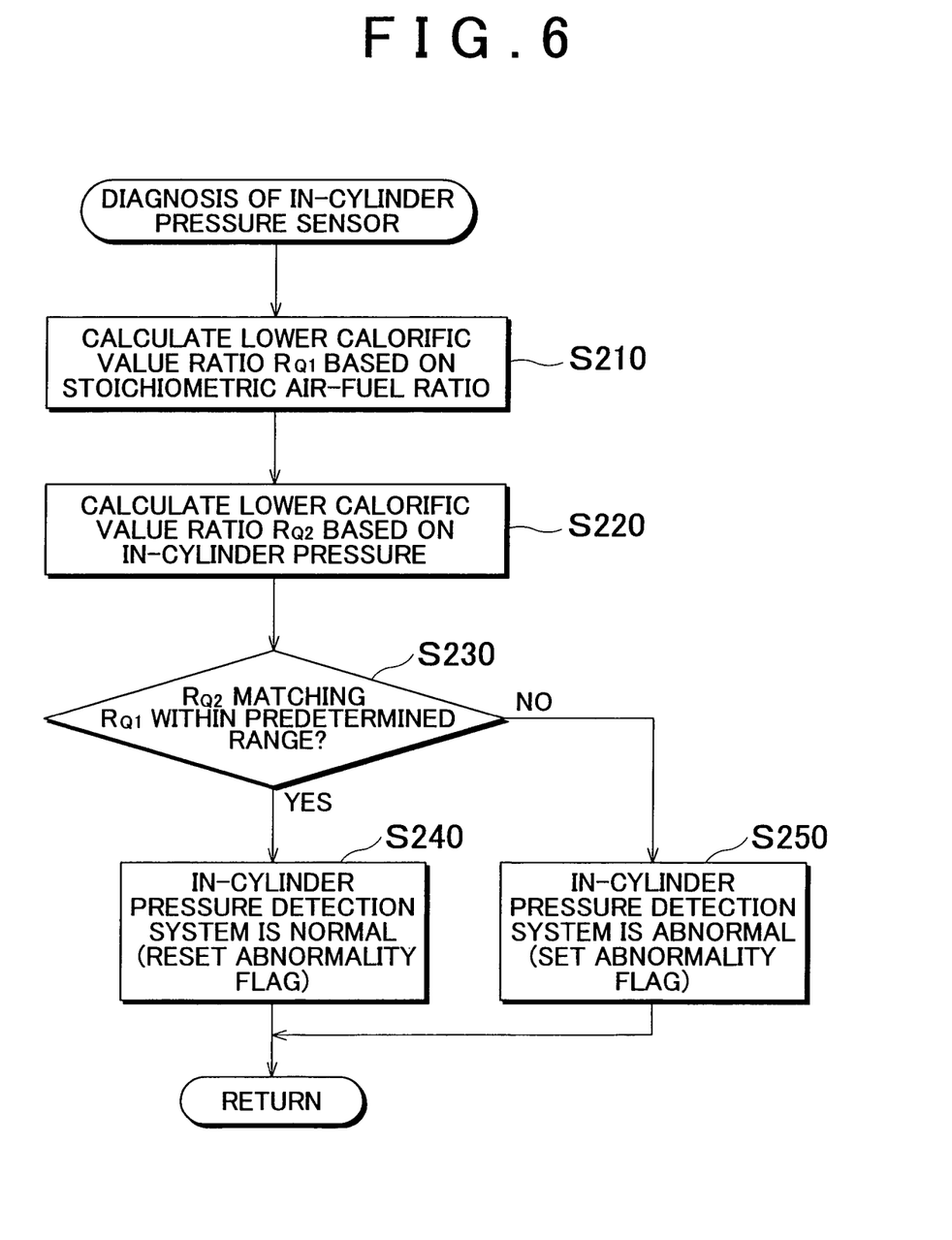
FIG. 6 is a flowchart showing a diagnostic process regarding an in-cylinder pressure detection system in a third embodiment.

Next, a third embodiment of the invention will be described. While the control device of the second embodiment calculates the lower calorific value on the basis of the stoichiometric air-fuel ratio, a control device of the third embodiment utilizes a process substantially the same as the portion related to the calculation of the lower calorific value (steps S110 to S160) and, furthermore, diagnoses an in-cylinder pressure detection system on the basis of the comparison between the value of lower calorific value (lower calorific value ratio $R_{Q1}$) calculated on the basis of the stoichiometric air-fuel ratio, and the value of the lower calorific value (lower calorific value ratio $R_{Q2}$) calculated on the basis of the in-cylinder pressure. The in-cylinder pressure detection system herein includes the in-cylinder pressure sensor 15 and a transmission path from the sensor to the ECU 20 as well as the programs and various reference values for performing a series of processes of determining the fuel property by using the detected in-cylinder pressure value. The mechanical construction of the third embodiment is substantially the same as that of the first embodiment, and description thereof is omitted.

A control in the third embodiment will be described. Referring to FIG. 6, the ECU 20 firstly calculates a value of the lower calorific value (lower calorific value ratio $R_{Q1}$) on the basis of the stoichiometric air-fuel ratio (S210). The process of this step S210 is substantially the same as the foregoing process of steps S110 to S160 of the second embodiment.

Next, the ECU 20 calculates a value of the lower calorific value (lower calorific value ratio $R_{Q2}$) on the basis of the in-cylinder pressure (S220). This process of step S220 is substantially the same as the process of steps S10 to S30 of the first embodiment.

Then, the ECU 20 determines whether or not the lower calorific value ratio $R_{Q2}$ calculated on the basis of the in-cylinder pressure matches the lower calorific value ratio $R_{Q1}$ calculated on the basis of the stoichiometric air-fuel ratio within a predetermined range (S230). If an affirmative determination is made, the ECU 20 determines that the in-cylinder pressure detection system is normal, and resets a predetermined in-cylinder pressure detection system abnormality flag (S240). Besides, if a negative determination is made in step S230, the ECU 20 determines that the in-cylinder pressure detection system is abnormal, and sets an in-cylinder pressure detection system abnormality flag (S250). The in-cylinder pressure detection system abnormality flag is referred to during another control that uses the detected in-cylinder pressure value or uses a result of a computation performed through the use of the detected in-cylinder pressure value. In the case where the flag has been set, the control that uses the detected in-cylinder pressure value or the result of the computation performed through the use of the same detected value is aborted, or a predetermined substitute value is used for the detected in-cylinder pressure value or the result of the computation performed through the use of the detected in-cylinder pressure value.

As described above, in the third embodiment, it becomes possible to diagnose the in-cylinder pressure detection system. Although the third embodiment is described above in conjunction with the construction of diagnosing the in-cylinder pressure detection system, this construction may also be replaced by a construction in which it is determined that the air-fuel ratio detection system is abnormal in the case where the lower calorific value ratio $R_{Q2}$ does not match the lower calorific value ratio $R_{Q1}$ within a predetermined range. The air-fuel ratio detection system herein includes the A/F sensor 17, the transmission path from the A/F sensor 17 to the ECU 20 as well as the programs and the various reference values for performing a series of processes of calculating the stoichiometric air-fuel ratio by using the air-fuel ratio detected value.

Besides, it is also possible to adopt a construction in which the diagnosis about the in-cylinder pressure detection system and the air-fuel ratio detection system is performed by determining that both systems are abnormal if the lower calorific value ratio $R_{Q2}$ does not match the lower calorific value ratio $R_{Q1}$ within a predetermined range. Furthermore, it is also possible to adopt a construction in which it is determined whether or not either one of the in-cylinder pressure detection system and the air-fuel ratio detection system is abnormal through the use of a majority decision logic, by referring to results of diagnosis about the in-cylinder pressure detection system and/or the air-fuel ratio detection system performed by other diagnostic means (e.g., a fuel property sensor disposed in the fuel system which determines the viscosity and the specific gravity of fuel from the refractive index thereof, and a process program of diagnosing the in-cylinder pressure detection system by comparing the lower calorific value calculated from the detected value from the fuel property sensor and the lower calorific value calculated from the in-cylinder pressure).

Incidentally, although in conjunction with the foregoing embodiments, the invention has been described with certain degrees of concreteness, it should be understood that the invention can be changed or modified in various manners and the like without departing from the sprit and scope of the invention described in the appended claims for patent. That is, the invention includes alterations and modifications that are within the scope defined by the claims for patent and within the scope and gist of equivalents of what are described in the claims. For example, as for the technique of finding a stoichiometric air-fuel ratio from the detected value from the A/F sensor 17 may also be various techniques other than those shown in conjunction with the foregoing embodiments. Besides, although in the foregoing embodiments, the invention is applied to internal combustion engines of vehicles that are able to use gasoline-alcohol blended fuel, the invention is also applicable to internal combustion engines that use one single or more other kinds of fuels and also to hybrid vehicles equipped with various internal combustion engines as drive sources.

The invention claimed is:

1. An internal combustion engine control device, comprising:
    an air-fuel ratio sensor that detects air-fuel ratio of an exhaust gas of an internal combustion engine;
    a stoichiometric air-fuel ratio calculation device that calculates a stoichiometric air-fuel ratio based on the air-fuel ratio detected value detected by the air-fuel ratio sensor;
    an air-fuel ratio-based lower calorific value ratio calculation device configured to calculate a lower calorific value ratio of a fuel from the stoichiometric air-fuel ratio calculated by the stoichiometric air-fuel ratio calculation device, based on a known relationship between the lower calorific value ratio and the stoichiometric air-fuel ratio; and
    an $O_2$ sensor that detects oxygen concentration in the exhaust gas of the internal combustion engine, wherein
    the air-fuel ratio-based lower calorific value ratio calculation device calculates the lower calorific value ratio based on a weighted average stoichiometric air-fuel ratio calculated by weighting the air-fuel ratio detected by the air-fuel ratio sensor with an output value of the $O_2$ sensor, and
    wherein the lower calorific value ratio herein is a proportion of the lower calorific value ratio of a present fuel to the lower calorific value of a standard gasoline fuel.

2. The control device according to claim 1, further comprising:
    an in-cylinder pressure sensor that detects pressure in a cylinder of the internal combustion engine;
    a pressure-based lower calorific value ratio calculation device that calculates the lower calorific value ratio based on the detected in-cylinder pressure value; and
    a diagnostic device that diagnoses at least one of the air-fuel ratio-based lower calorific value ratio calculation device and the pressure-based lower calorific value ratio calculation device based on comparison between the lower calorific value ratio calculated by the air-fuel ratio- based lower calorific value ratio calculation device and the lower calorific value ratio calculated by the pressure-based lower calorific value ratio calculation device.

3. The control device according to claim 1 further comprising:
    an in-cylinder pressure sensor that detects pressure in a cylinder of the internal combustion engine;
    a pressure-based lower calorific value ratio calculation device that calculates the lower calorific value ratio based on the detected in-cylinder pressure value, and
    a diagnostic device that diagnoses at least one of the air-fuel ratio-based lower calorific value ratio calculation device and the pressure-based lower calorific value ratio calculation device based on comparison between the lower calorific value ratio calculated by the air-fuel ratio-based lower calorific value ratio calculation device and the lower calorific value ratio calculated by the pressure-based lower calorific value ratio calculation device.

\* \* \* \* \*